(12) United States Patent
Ito

(10) Patent No.: US 10,060,800 B2
(45) Date of Patent: Aug. 28, 2018

(54) PHYSICAL QUANTITY MEASURING DEVICE AND PHYSICAL QUANTITY MEASURING SYSTEM

(71) Applicant: Murata Manufacturing Co., Ltd., Kyoto (JP)

(72) Inventor: Shigeo Ito, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 432 days.

(21) Appl. No.: 14/833,618

(22) Filed: Aug. 24, 2015

(65) Prior Publication Data

US 2015/0362377 A1 Dec. 17, 2015

Related U.S. Application Data

(63) Continuation of application No. PCT/JP2013/084012, filed on Dec. 19, 2013.

(30) Foreign Application Priority Data

Feb. 25, 2013 (JP) ................................ 2013-034137

(51) Int. Cl.
*G01K 1/00* (2006.01)
*G01K 3/00* (2006.01)
(Continued)

(52) U.S. Cl.
CPC ............ *G01K 1/024* (2013.01); *G01K 7/32* (2013.01); *G01K 11/26* (2013.01); *H04Q 9/00* (2013.01);
(Continued)

(58) Field of Classification Search
USPC ................................ 374/117, 100, 141, 163
See application file for complete search history.

(56) References Cited

U.S. PATENT DOCUMENTS

2011/0280279 A1* 11/2011 Gregory ................ F01D 17/085
374/152
2013/0003779 A1* 1/2013 Fukuda .................. G01K 1/024
374/117

FOREIGN PATENT DOCUMENTS

| JP | H03-238594 A | 10/1991 |
|---|---|---|
| JP | 2004-295431 A | 10/2004 |
| JP | 2012-168155 A | 9/2012 |

OTHER PUBLICATIONS

International Search Report issued in Application No. PCT/JP2013/084012 dated Mar. 25, 2014.

(Continued)

*Primary Examiner* — Mirellys Jagan
(74) *Attorney, Agent, or Firm* — Pearne & Gordon LLP

(57) ABSTRACT

An excitation signal generation unit generates excitation signals of frequency channels with mutually different frequency bands and transmits the excitation signals via an antenna. Reception signals of the frequency channels received by the antenna are inputted to a reception strength detection unit. The reception strength detection unit detects a resonance reverberation signal from the reception signals and detects the signal strength of the resonance reverberation signal. An excitation control unit controls the excitation signal generation unit to adjust the signal strength of the excitation signal such that the signal strength of the resonance reverberation signal reaches or falls below a level adjustment threshold. Upon the signal strength of the resonance reverberation signal reaching or falling below the level adjustment threshold, a temperature detection unit subjects the resonance reverberation signal to a frequency analysis so as to detect a physical quantity on the basis of a frequency spectral peak.

20 Claims, 10 Drawing Sheets

(51) Int. Cl.
*G01K 1/02* (2006.01)
*G01K 7/32* (2006.01)
*H04Q 9/00* (2006.01)
*G01K 11/26* (2006.01)

(52) U.S. Cl.
CPC ... *H04Q 2209/40* (2013.01); *H04Q 2209/823* (2013.01)

(56) References Cited

OTHER PUBLICATIONS

Translation of Written Opinion issued in Application No. PCT/JP2013/084012 dated Mar. 25, 2014.

* cited by examiner

PHYSICAL QUANTITY MEASURING DEVICE AND PHYSICAL QUANTITY MEASURING SYSTEM

BACKGROUND

Technical Field

The present disclosure relates to physical quantity measuring systems that detect physical quantities of a measurement target portion by using a principle that the resonant frequency of a resonator varies depending on a physical quantity such as the temperature and the magnetic field strength, and to physical quantity measuring devices to be used in such physical quantity measuring systems.

Background Art

Conventionally, a variety of systems for wirelessly detecting physical quantities of a remotely located measurement target portion have been devised. A wireless temperature measuring system that measures the temperature of a remote location is one such system. As described in Patent Document 1, for example, a wireless temperature measuring system is constituted by a sensor device disposed in a temperature measuring unit and a temperature measuring device disposed at a position spaced apart from the sensor device. The sensor device and the temperature measuring device are configured to be capable of wirelessly communicating with each other.

Among such wireless temperature measuring systems, there is a wireless temperature measuring system that includes a sensor device constituted by a sensor-side antenna and a resonator. In this case, a temperature measuring device transmits an excitation signal to the resonator of the sensor device. The resonator has temperature characteristics affecting its resonant frequency and thus generates a resonance reverberation signal at a resonant frequency corresponding to the temperature of a temperature measurement target portion on which the resonator is disposed. The resonance reverberation signal is transmitted to the temperature measuring device via the sensor-side antenna.

The temperature measuring device detects the frequency of the received resonance reverberation signal and thus calculates the temperature detected by the resonator.

The resonant frequency changes not only with a change in the temperature but also with a change in other physical quantities, such as the magnetic field strength, and thus it is possible to measure other physical quantities of the measurement target portion, as well as on the basis of a change in the resonant frequency.

Patent Document 1: Japanese Unexamined Patent Application Publication No. 3-238594

BRIEF SUMMARY

However, the resonant frequency of a resonator changes not only with the temperature but also with an excitation intensity. FIG. 10 is a graph indicating a change in the resonant frequency occurring with a change in the excitation intensity of a quartz vibrator. In FIG. 10, the horizontal axis indicates the excitation level (excitation intensity), and the vertical axis indicates the amount of change in the resonant frequency. The amount of change in the resonant frequency on the vertical axis is indicated as the amount of change with a resonant frequency at an excitation level of −20 [dBm] serving as a reference.

As illustrated in FIG. 10, as the excitation intensity is higher, the change in the resonant frequency is greater. In addition, as the excitation intensity is higher, a variation in the resonant frequency is greater.

FIG. 11 is a graph illustrating the communication distance and an error in the resonant frequency. In FIG. 11, the horizontal axis indicates the communication distance between the temperature measuring device and the sensor device, and the vertical axis indicates an error in the resonant frequency. The error in the resonant frequency on the vertical axis is indicated with the resonant frequency at a position of the communication distance DISa indicated in FIG. 11 serving as a reference.

As illustrated in FIG. 11, as the communication distance becomes shorter, the error in the resonant frequency becomes greater. This is because the excitation signal attenuates less in wireless communication as the communication distance becomes shorter and the strength of the excitation signal applied to the resonator becomes higher. Thus, even when the communication distance DISa is defined and the excitation intensity is adjusted so as not to be problematic at the communication distance DISa, the resonant frequency is shifted when the communication distance is reduced. Accordingly, the resonant frequency may be shifted depending on a usage mode.

When the resonant frequency is shifted in this manner, a calculated temperature is also shifted since the temperature is calculated on the basis of the resonant frequency. Consequently, the accuracy in measuring the temperature of the temperature measurement target portion deteriorates. In the case of measuring other physical quantities, in a similar manner, the accuracy in measuring the physical quantities of the measurement target portion deteriorates.

The present disclosure is directed to providing a physical quantity measuring system that can measure a physical quantity of a measurement target portion with high accuracy and a physical quantity measuring device to be used in such a physical quantity measuring system.

The present disclosure relates to a physical quantity measuring device having the following features. The physical quantity measuring device includes an excitation signal generation unit, an antenna, a reception strength detection unit, a physical quantity detection unit, and an excitation control unit. The excitation signal generation unit generates an excitation signal composed of burst waves of a predetermined frequency. The antenna transmits the excitation signal and receives a reception signal corresponding to the excitation signal. The reception strength detection unit detects a resonance reverberation signal of the excitation signal from the reception signal and detects the signal strength of the resonance reverberation signal. The physical quantity detection unit detects a predetermined physical quantity on the basis of the resonant frequency of the resonance reverberation signal. The excitation control unit lowers the signal strength of the excitation signal upon detecting that the signal strength of the resonance reverberation signal is higher than a signal strength threshold.

With this configuration, the signal strength of the excitation signal is adjusted such that the resonant frequency corresponding to a physical quantity does not have an error from the signal strength of the excitation signal.

In addition, the physical quantity measuring device of the present disclosure may be configured as follows. The excitation signal generation unit generates excitation signals of a plurality of frequency channels that have predetermined frequency band widths having mutually different center frequencies. The reception strength detection unit detects the resonance reverberation signal by comparing the signal strengths of reception signals corresponding to the excitation signals of the respective frequency channels.

This configuration makes it possible to detect the resonance reverberation signal by using the reception signals divided into a plurality of frequency bands with certainty and with accuracy.

In addition, upon detecting the resonance reverberation signal, the excitation control unit of the physical quantity measuring device of the present disclosure may control the excitation signal generation unit so as to generate only an excitation signal of a frequency channel that includes a frequency of the resonance reverberation signal.

With this configuration, a plurality of instances of the resonance reverberation signals can be obtained quickly.

In addition, the physical quantity detection unit of the physical quantity measuring device of the present disclosure may start detecting the resonant frequency from a point in time at which the signal strength of the resonance reverberation signal has reached or fallen below the signal strength threshold.

With this configuration, an unnecessary process of detecting the resonant frequency can be prevented.

In addition, the excitation control unit of the physical quantity measuring device of the present disclosure can adjust the signal strength of the excitation signal by adjusting the length of a transmission time of the excitation signal.

With this configuration, a specific example of a method for adjusting the signal strength of the excitation signal is illustrated.

In addition, the excitation control unit of the physical quantity measuring device of the present disclosure can adjust the signal strength of the excitation signal by adjusting the amplitude level of the excitation signal.

With this configuration as well, a specific example of the method for adjusting the signal strength of the excitation signal is illustrated. Furthermore, it is also possible to adjust the signal strength of the excitation signal through a combination of the length of the transmission time and the amplitude level.

In addition, the excitation signal generation unit of the physical quantity measuring device of the present disclosure may set an initial excitation signal to have a maximum strength among the excitation signals to be transmitted until the signal strength of the resonance reverberation signal finishes being adjusted.

With this configuration, a process of adjusting the signal strength of the excitation signal to a maximum strength that does not affect the resonant frequency can be carried out quickly.

In addition, the reception strength detection unit of the physical quantity measuring device of the present disclosure may make a determination on the basis of the amplitude level of the reception signals arranged on a time axis so as to span a predetermined period of time starting from the beginning.

This configuration makes it possible to detect the signal strength of the reception signal, or in other words, the signal strength of the resonance reverberation signal in a relatively stable manner and with accuracy.

In addition, a physical quantity measuring system of the present disclosure includes the above-described physical quantity measuring device; and a sensor device including a resonator that is excited upon receiving an excitation signal and resonates at a frequency corresponding to a physical quantity so as to generate a resonance reverberation signal and a resonator-side antenna connected to the resonator.

With this configuration, the physical quantity measuring system that measures the physical quantity of a measurement target portion with accuracy by using the physical quantity measuring device configured as described above can be provided.

In addition, the resonator of the physical quantity measuring system of the present disclosure can be implemented by a quartz vibrator. With this configuration, a specific example of the resonator is illustrated.

In addition, the physical quantity in the physical quantity measuring system of the present disclosure may be a temperature. With this configuration, a specific example of the physical quantity to be measured by the physical quantity measuring system is illustrated.

According to the present disclosure, the temperature of a temperature measurement target portion can be measured with high accuracy without necessarily being affected by a usage mode.

BRIEF DESCRIPTION OF THE SEVERAL
VIEWS OF THE DRAWINGS

A physical quantity measuring system according to a first embodiment of the present disclosure will be described with reference to the drawings. In the present embodiment, a temperature measuring system that measures the temperature of a measurement target portion will be described.

Figure 1:
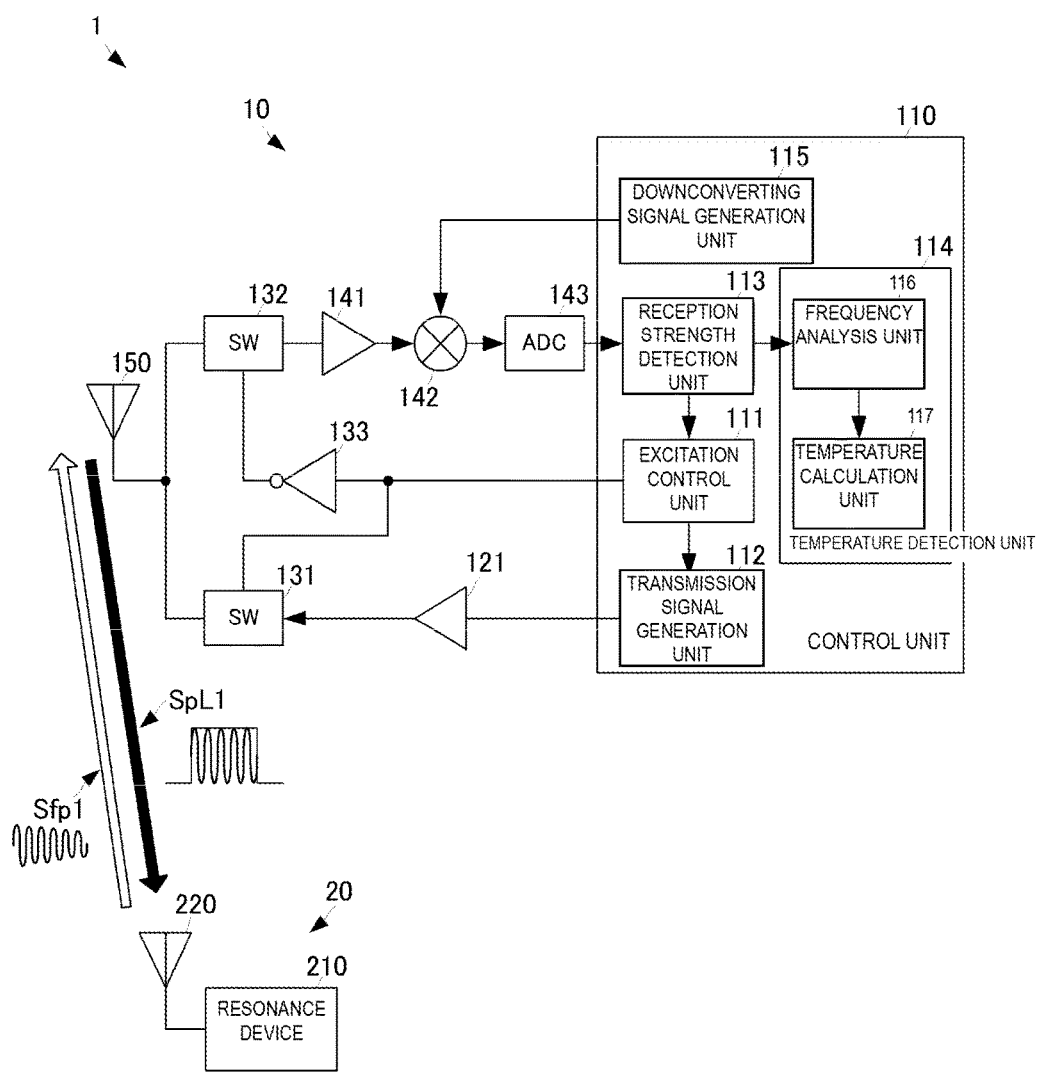
FIG. 1 illustrates a configuration of a temperature measuring system according to a first embodiment of the present disclosure.
Figure 2:
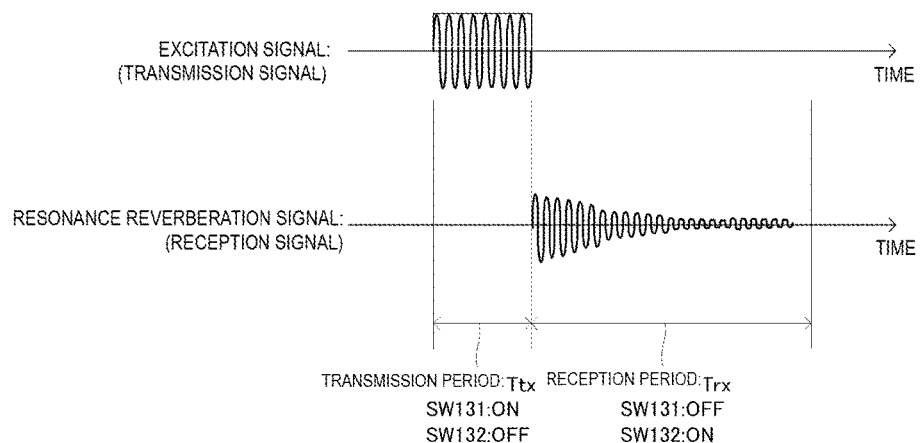
FIG. 2 is a waveform diagram of an excitation signal and a resonance reverberation signal used in the temperature measuring system according to the first embodiment of the present disclosure.

FIG. 1 illustrates the configuration of the temperature measuring system according to the first embodiment of the present disclosure. FIG. 2 is a waveform diagram of an excitation signal and a resonance reverberation signal used in the temperature measuring system according to the first embodiment of the present disclosure.

A temperature measuring system 1 includes a temperature measuring device 10 and a sensor device 20. The sensor device 20 is disposed on a measurement target portion, and the temperature measuring device 10 is disposed so as to be spaced apart from the sensor device 20 with a distance that allows the temperature measuring device 10 to communicate wirelessly with the sensor device 20.

The temperature measuring device 10 includes a control unit 110, a transmission amplifier 121, a first switch 131, a second switch 132, an inversion circuit 133, a reception amplifier 141, a downconverter 142, an ADC 143, and an antenna 150. The control unit 110 includes an excitation control unit 111, a transmission signal generation unit 112, a reception strength detection unit 113, a temperature detection unit 114, and a downconverting signal generation unit 115. The sensor device 20 includes a resonance device 210 and a resonance-side antenna 220.

The transmission signal generation unit 112 of the control unit 110 is a voltage controlled oscillator or the like. The transmission signal generation unit 112 generates a transmission signal on the basis of frequency channel information or the like from the excitation signal control unit 111 and outputs the generated transmission signal to the transmission amplifier 121. The frequency channel information includes the center frequency of each frequency channel, a switching timing of the frequency channels, and so on. The transmission signal is composed of sinusoidal waves of a predetermined frequency. The frequency of the transmission signal is switched for each frequency channel. The transmission amplifier 121 is a so-called power amplifier. The transmission amplifier 121 amplifies the transmission signal and outputs the amplified transmission signal to the first switch 131.

The first switch 131 receives a transmission and reception control signal from the excitation control unit 111. The transmission and reception control signal is composed of two values that are reciprocal between the time of transmission and the time of reception. For example, the transmission and reception control signal is set to be Hi during a transmission period Ttx and Low in a reception period Trx. The timing at which the transmission and reception control signal becomes Hi is synchronized with the timing at which the frequency channel is switched.

The first switch 131 becomes conductive upon receiving a Hi transmission and reception control signal and connects an output terminal of the transmission amplifier 121 to the antenna 150. Meanwhile, upon receiving a Low transmission and reception control signal, the first switch 131 is released and disconnects the output terminal of the transmission amplifier 121 from the antenna 150. With this configuration, as illustrated in FIG. 2, the transmission signal is supplied to the antenna 150 only during the transmission period Ttx, and thus the transmission signal has a pulsed waveform and results in a pulsed burst signal having a desired amplitude. This pulsed burst signal serves as an excitation signal SpL1.

The transmission signal generation unit 112, the transmission amplifier 121, and the first switch 131 configured as described above correspond to an excitation signal generation unit of the present disclosure. This excitation signal generation unit outputs the transmission signal while switching the frequency of the transmission signal on the basis of the frequency channel information as described above. Thus the excitation signal generation unit successively generates excitation signals of a plurality of frequency channels and outputs the generated excitation signals to the antenna 150. At this point, the excitation signal generation unit successively transmits the excitation signals of the respective channels with a reception period Trx corresponding to each of the excitation signals provided therebetween. For example, after transmitting an excitation signal of a channel CH1 in a transmission period Ttx, the excitation signal generation unit transmits an excitation signal of a channel CH2 in another transmission period Ttx with a reception period Trx corresponding to the excitation signal of the channel CH1 provided therebetween.

Figure 3:
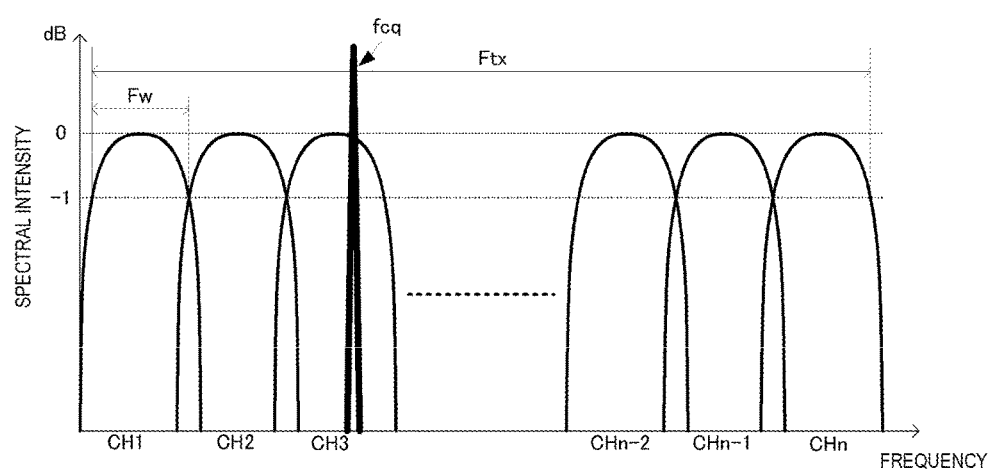
FIG. 3 illustrates a frequency spectral distribution of an excitation signal.

FIG. 3 illustrates a frequency spectral distribution of an excitation signal. The horizontal axis in FIG. 3 indicates the frequency, and the vertical axis indicates the spectral intensity. As illustrated in FIG. 3, in the excitation signal generation unit of the present embodiment, the center frequency and the transmission period Ttx of the excitation signal of each frequency channel are set such that a plurality of frequency channels each having a predetermined frequency band width Fx are continuously distributed across a scan frequency band Ftx. The center frequency of the frequency band of each frequency channel is determined by the center frequency of the excitation signal, and the frequency band width Fx is determined by the transmission period Ttx.

Specifically, in the case illustrated in FIG. 3, the frequency channels CH1 to CHn (n is a predetermined integer) are set in the scan frequency band Ftx such that the frequency channels partially overlap. The excitation signal of each frequency channel overlaps a spectrum of an adjacent frequency channel at a frequency at which the excitation signal has attenuated by 1 dB relative to its peak level. A frequency width of each frequency channel that does not overlap an adjacent frequency channel is Fw, and the entire region of the scan frequency band Ftx is set to be covered by the frequency widths Fw of the frequency channels CH1 to CHn.

With this configuration, excitation signals of a plurality of frequency channels having mutually different frequency bands are outputted. The scan frequency band Ftx is determined by a frequency band corresponding to a temperature range in which a temperature is to be measured by the resonance device 210.

When such an excitation signal is outputted, the second switch 132 receives an input of a transmission and reception control signal that has its state inverted by the inversion circuit 133. As in the first switch 131, the second switch 132 becomes conductive upon receiving a Hi transmission and reception control signal and is released upon receiving a Low transmission and reception control signal.

The second switch 132 is connected between the antenna 150 and the reception amplifier 141. Upon receiving a Low transmission and reception control signal (when a Hi transmission and reception control signal is inputted to the first switch 131), the second switch 132 is released and disconnects the antenna 150 from the reception amplifier 141. Thus, the second switch 132 is released in the transmission period Ttx, and a communication signal is prevented from being inputted to the reception amplifier 141. Accordingly, the excitation signal SpL1 outputted from the first switch 131 is supplied only to the antenna 150 and is not inputted to the reception amplifier 141.

Meanwhile, upon receiving a Hi transmission and reception control signal (when a Low transmission and reception control signal is inputted to the first switch 131), the second switch 123 becomes conductive and connects the antenna 150 to the reception amplifier 141. Thus, the reception signal from the antenna 150 is inputted to the reception amplifier 141. At this point, the first switch 131 is being released, and thus the reception signal is prevented from being inputted to the transmission amplifier 121.

The antenna 150 and the resonance-side antenna 220, for example, form a loop antenna and transmit and receive a high-frequency signal to and from each other through magnetic field coupling. The form of the antenna is not limited to a loop form, and the antenna may take on a different form and undergo a different type of coupling.

The excitation signal SpL1 of each frequency channel transmitted from the antenna 150 is received by the resonance-side antenna 220 and is supplied to the resonance device 210.

The resonance device 210 is constituted, for example, by a quartz vibrator. When the resonance device 210 receives the excitation signal SpL1 of each frequency channel and receives an excitation signal Spf1 of a frequency channel that includes a resonant frequency of the resonance device 210, the resonance device 210 resonates at the resonant frequency and generates a resonance reverberation signal Sfp1. The resonance reverberation signal Sfp1 is a signal that starts vibrating at an amplitude corresponding to the signal strength of the excitation signal SpL1 applied to the resonance device 210 at the start of resonance, and the stated amplitude attenuates with time at a predetermined time constant, as illustrated in FIG. 2.

The resonant frequency of the quartz vibrator constituting the resonance device 210 has temperature dependence. Therefore, the resonant frequency of the resonance reverberation signal Sfp1 becomes a resonant frequency corresponding to the temperature of the measurement target portion on which the resonance device 210 is disposed.

The resonance device 210 outputs the resonance reverberation signal Sfp1 to the resonance-side antenna 220, and the resonance-side antenna 220 transmits the resonance reverberation signal Sfp1 to the outside. The resonance reverberation signal Sfp1 is received by the antenna 150.

When the resonance reverberation signal Sfp1 is received by the antenna 150, the second switch 132 is conductive, and the first switch 131 is released, as described above. Therefore, the resonance reverberation signal Sfp1 is inputted to the reception amplifier 141 via the second switch 132. During the reception period Trx of a frequency channel that does not include the resonance reverberation signal Sfp1, a reception signal composed of noise and so on is inputted to the reception amplifier 141.

The reception amplifier 141 is a so-called LNA (low-noise amplifier). The reception amplifier 141 amplifies the resonance reverberation signal Sfp1 and outputs the amplified resonance reverberation signal Sfp1 to the downconverter 142. The downconverter 142 receives the resonance reverberation signal Sfp1 and a downconverting signal generated by the downconverting signal generation unit 115 of the control unit 110. The downconverter 142 mixes the resonance reverberation signal Sfp1 with the downconverting signal and outputs the resonance reverberation signal Sfp1 of an intermediate frequency. The resonance reverberation signal Sfp1 that has been converted to a signal of an intermediate frequency is inputted to the ADC (analog-digital conversion circuit) 143. The ADC 143 digitally samples the resonance reverberation signal Sfp1 and outputs the result to the reception strength detection unit 113 of the control unit 110. During the reception period Trx of a frequency channel that does not include the resonance reverberation signal, a reception signal composed of noise and so on is outputted to the reception strength detection unit 113 via the reception amplifier 141, the downconverter 142, and the ADC 143.

The reception strength detection unit 113 detects the signal strength of the reception signal of each frequency channel, or in other words, the signal strength of a reception signal that includes the resonance reverberation signal Sfp1 or the signal strength of a reception signal that does not include the resonance reverberation signal Sfp1, and outputs the detected signal strength to the excitation control unit 111.

Figure 4:
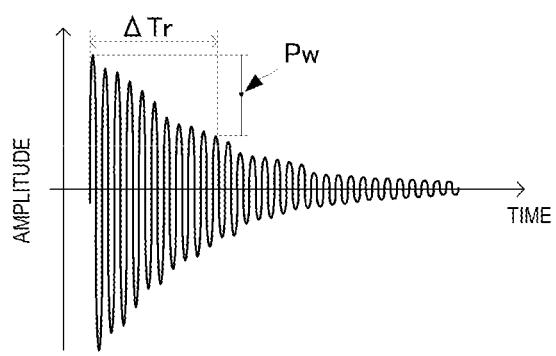
FIG. 4 is a waveform diagram conceptually illustrating detection of a reception signal strength.

FIG. 4 is a waveform diagram conceptually illustrating detection of the reception signal strength. FIG. 4 illustrates the case of the resonance reverberation signal Sfp1. As illustrated in FIG. 4, the reception strength detection unit 113 successively detects a peak in an amplitude in a waveform spanning for predetermined duration ΔTr from a timing at which a reception signal starts being received, or in other words, a timing at which the reception period Trx starts. Then, the reception strength detection unit 113 calculates a representative value Pw of the plurality of amplitude peaks. The representative value Pw is, for example, a median value. With such a process, the representative value Pw takes a value equal to or higher than a predetermined level in a reception signal of a frequency channel that includes the resonance reverberation signal Sfp1. Meanwhile, the representative value Pw takes a value that is as low as a noise level in a reception signal of a frequency channel that does not include the resonance reverberation signal Sfp1. Therefore, by determining a representative value for detecting the strength of the reception signal of each frequency channel on the basis of a plurality of amplitude peaks within the predetermined duration ΔTr, a situation in which it is determined that the resonance reverberation signal is present can be prevented with certainty. In addition, even if noise with a high amplitude level is received unexpectedly, this influence can be suppressed, and a false determination on the presence of the resonance reverberation signal can be prevented.

The excitation control unit 111 compares the representative values Pw of the reception signal strengths of the respective frequency channels and detects the signal strength of the resonance reverberation signal Sfp1 and the frequency channel that includes the resonance reverberation signal Sfp1. For example, the excitation control unit 111 compares the representative values Pw of the respective frequency channels and sets the highest representative value as the signal strength of the resonance reverberation signal Sfp1. Then, the excitation control unit 111 sets the frequency channel in which the highest representative value has been obtained as the frequency channel that includes the resonance reverberation signal Sfp1.

Figure 5:
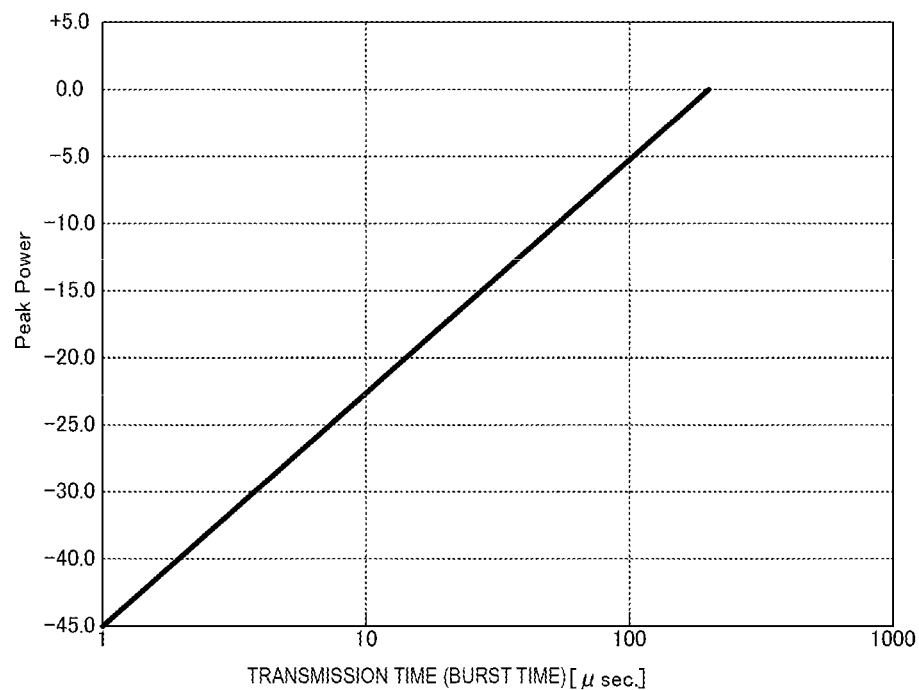
FIGS. 5A and 5B illustrate a graph indicating a relation between the length of a transmission period Ttx (transmission time) and the peak power of the excitation signal, and a graph indicating a relation between the peak power of the excitation signal and the frequency band width of the excitation signal.
Figure 5:
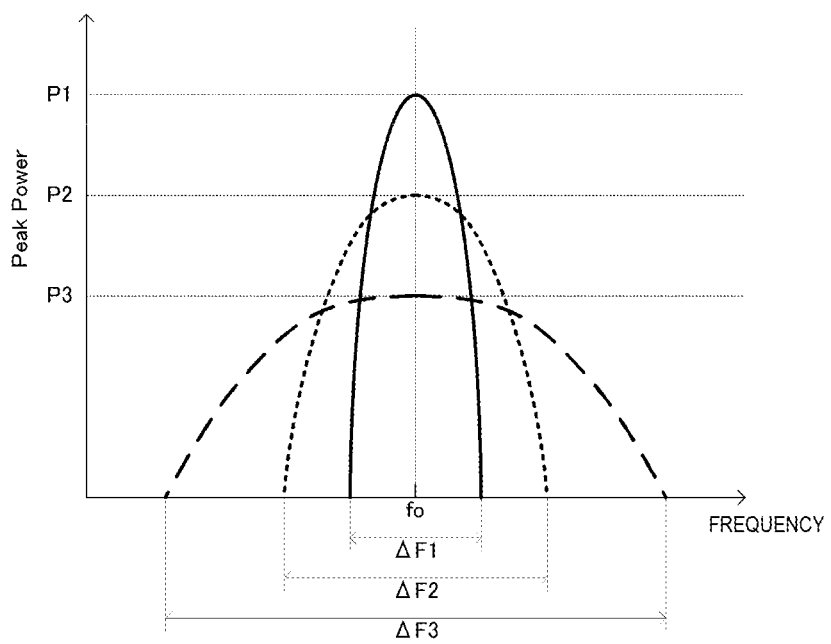

The excitation control unit 111 determines whether the signal strength of the resonance reverberation signal Sfp1 is equal to or lower than a level adjustment threshold Thp. If the signal strength of the resonance reverberation signal Sfp1 is higher than the level adjustment threshold Thp, the excitation control unit 111 carries out control such that the signal strength of the excitation signal SpL1 is lowered. Specifically, the excitation control unit 111 carries out control such that the duration of the transmission period Ttx of the transmission and reception control signal is reduced. FIG. 5A is a graph illustrating a relation between the length of the transmission period Ttx (transmission time) and the peak power of the excitation signal. FIG. 5B is a graph illustrating a relation between the peak power of the excitation signal and the frequency band width of the excitation signal.

As illustrated in FIG. 5A, when the length of the transmission period (transmission time, pulse burst length) is set shorter, the peak power of the excitation signal decreases.

When the peak power of the excitation signal decreases, the power of the excitation signal applied to the resonance device 210 decreases, and thus the amplitude of the resonance reverberation signal Sfp1 generated by the resonance device 210 also decreases. At this point, the frequency band is broadened along with the decrease in the power of the excitation signal.

The excitation control unit 111 repeats the control of lowering the signal strength of the excitation signal until the signal strength of the resonance reverberation signal Sfp1 reaches or falls below the level adjustment threshold Thp. Upon detecting that the signal strength of the resonance reverberation signal Sfp1 has reached or fallen below the level adjustment threshold Thp, the excitation control unit 111 controls the reception strength detection unit 113 so as to output a reception signal that includes the resonance reverberation signal Sfp1 to the temperature detection unit 114. After the signal strength of the resonance reverberation signal Sfp1 has reached or fallen below the level adjustment threshold Thp, the reception strength detection unit 113 outputs the reception signal continually to the temperature detection unit 114.

At this point, the level adjustment threshold Thp is set to a value at which a change in the resonant frequency of the resonance device 210 depending on the excitation signal strength hardly occurs. Thus, as the excitation signal strength is set to be equal to or lower than the level adjustment threshold Thp, the resonance device 210 generates a resonance reverberation signal of a resonant frequency that is dependent only on the detected temperature. Accordingly, the temperature of the measurement target portion can be detected with accuracy by detecting the resonant frequency of the resonance reverberation signal in a state in which the excitation signal strength is set to be equal to or lower than the level adjustment threshold Thp in the aforementioned manner.

The excitation control unit 111 configures the settings of the transmission signal generation unit 112 such that the transmission signal generation unit 112 generates only a transmission signal of a frequency channel that includes the resonance reverberation signal Sfp1. With such a process, the transmission and reception periods of the excitation signal of the frequency channel that does not include the resonance reverberation signal Sfp1 can be omitted, and which makes it possible to speed up the temperature detection process.

As such a process of lowering the excitation signal to or below the predetermine level is carried out, the band width of the frequency channel is broadened, as illustrated in FIG. 5B mentioned above. Therefore, the frequency range in which the resonance reverberation signal Sfp1 has initially been detected is included in a frequency range obtained after the excitation signal is lowered. Thus, even if the resonant frequency of the resonance reverberation signal Sfp1 deviates, due to the level of the excitation signal being high, from an accurate resonant frequency to be held under the condition in which the level of the excitation signal to be measured is equal to or lower than a predetermined value, the spectrum of the resonance reverberation signal Sfp1 obtained after the excitation signal has been lowered appears, with certainty, within the frequency range obtained after the excitation signal has been lowered. Accordingly, the resonance reverberation signal Sfp1 can be obtained with certainty.

The temperature detection unit 114 includes a frequency analysis unit 116 and a temperature calculation unit 117. The frequency analysis unit 116 converts a reception signal that includes the resonance reverberation signal Sfp1 on a time axis (hereinafter, simply referred to the resonance reverberation signal) to a signal on a frequency axis. Specifically, the frequency analysis unit 116 subjects an inputted resonance reverberation signal to Fourier transform. The frequency spectrum of the resonance reverberation signal obtained by the frequency analysis unit 116 is outputted to the temperature calculation unit 117.

The temperature calculation unit 117 detects a spectral peak of the frequency spectrum of the resonance reverberation signal. The temperature calculation unit 117 stores in advance a frequency and temperature relation or a frequency and temperature relation table defining a relation between the frequency spectral peaks and the temperatures of the resonance device 210. The temperature calculation unit 117 calculates the temperature detected by the resonance device 210, or in other words, the temperature of the measurement target portion on the basis of the detected spectral peak and the aforementioned frequency and temperature relation or frequency and temperature relation table.

As described thus far, with the configuration of the present embodiment, the excitation signal can be lowered without necessarily affecting the resonant frequency of the resonance device 210. Thus, the temperature of the measurement target portion can be measured with accuracy.

Figure 6:
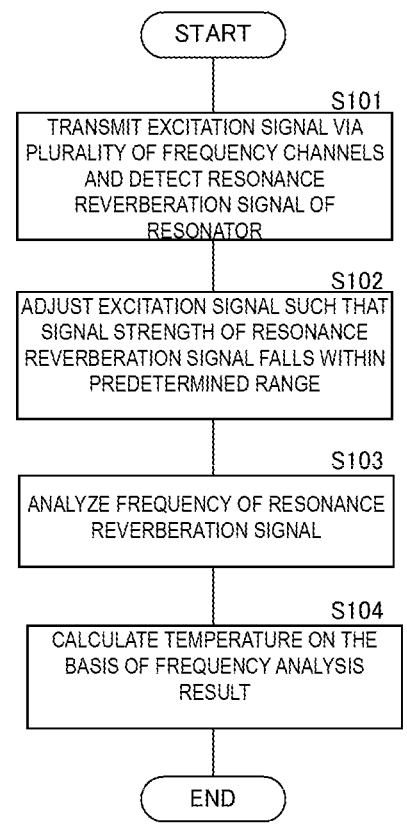
FIG. 6 is a flowchart illustrating a temperature measuring method according to the first embodiment of the present disclosure.

The process described above may be implemented by a configuration that is not limited to the one described above but any configuration that can implement the flow illustrated hereinafter. FIG. 6 is a flowchart illustrating a temperature measuring method according to the first embodiment of the present disclosure.

In the temperature measuring method of the present embodiment, an excitation signal is transmitted to a resonance device via a plurality of frequency channels. Then, a reception signal of a frequency channel that includes a resonance reverberation signal is detected from among the reception signals of the plurality of frequency channels (S101).

Subsequently, the signal strength of the resonance reverberation signal is monitored, and the signal strength of the excitation signal is adjusted such that the signal strength of the resonance reverberation signal reaches or falls below the level adjustment threshold Thp (S102). At this point, the signal strength of the excitation signal is adjusted by adjusting the length of the transmission period Ttx.

Next, the resonance reverberation signal that has reached or fallen below the level adjustment threshold Thp is subjected to a frequency analysis (S103). Then, on the basis of the result of the frequency analysis, the temperature detected by the resonance device is calculated (S104).

Figure 7:
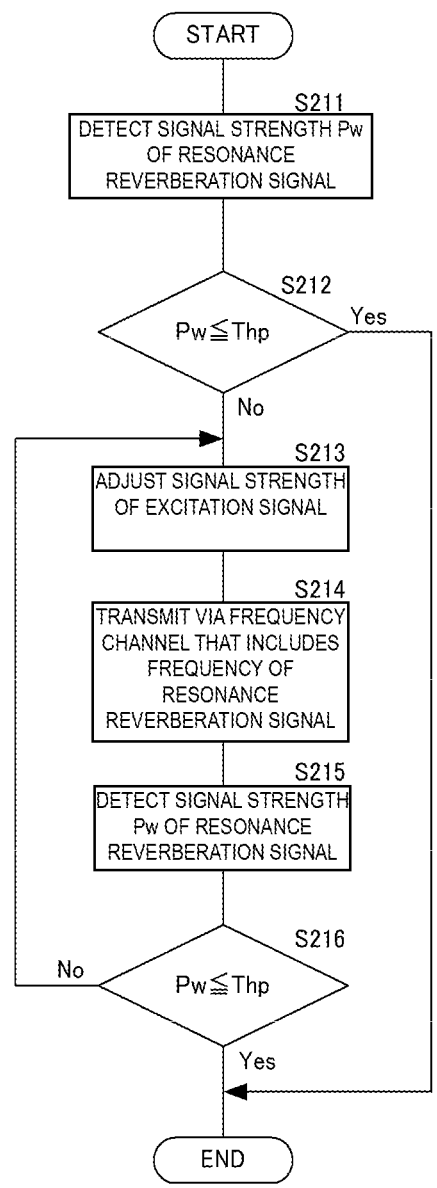
FIG. 7 is a flowchart illustrating a method for adjusting the signal strength of the excitation signal according to the first embodiment of the present disclosure.

The adjustment of the signal strength of the excitation signal is achieved through a flow illustrated in FIG. 7. FIG. 7 is a flowchart illustrating a method for adjusting the signal strength of the excitation signal according to the first embodiment of the present disclosure.

Upon a frequency channel that includes the resonance reverberation signal being detected, the representative value (hereinafter, simply the signal strength of the resonance reverberation signal) Pw of the amplitude levels of the resonance reverberation signal is detected (S211). Subsequently, the signal strength Pw of the resonance reverberation signal is compared with the level adjustment threshold Thp. If the signal strength Pw of the resonance reverberation signal is equal to or lower than the level adjustment threshold Thp (S212: Yes), the signal strength of the excitation signal is left unadjusted.

Meanwhile, if the signal strength Pw of the resonance reverberation signal is higher than the level adjustment threshold Thp (S212: No), the signal strength of the excitation signal is adjusted (S213).

Thereafter, only an excitation signal of the frequency channel that includes the resonance reverberation signal is transmitted (S214), and the signal strength of this resonance reverberation signal is detected (S215).

If the signal strength Pw of the resonance reverberation signal is higher than the level adjustment threshold Thp (S216: No), the adjustment of the signal strength of the excitation signal is repeated (S213).

Then, when it is detected that the signal strength Pw of the resonance reverberation signal has reached or fallen below the level adjustment threshold Thp (S216: Yes), the adjustment of the signal strength of the excitation signal is terminated.

Figure 8:
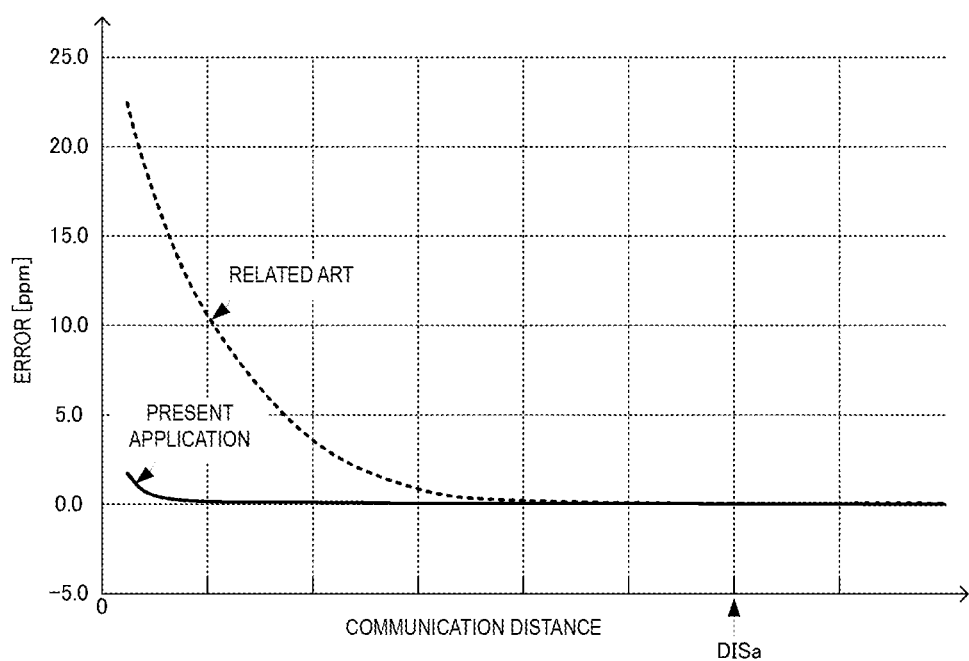
FIG. 8 is a graph illustrating dependence of an error in the resonant frequency on the communication distance between a temperature measuring device 10 and a sensor device 20.
Figure 11:
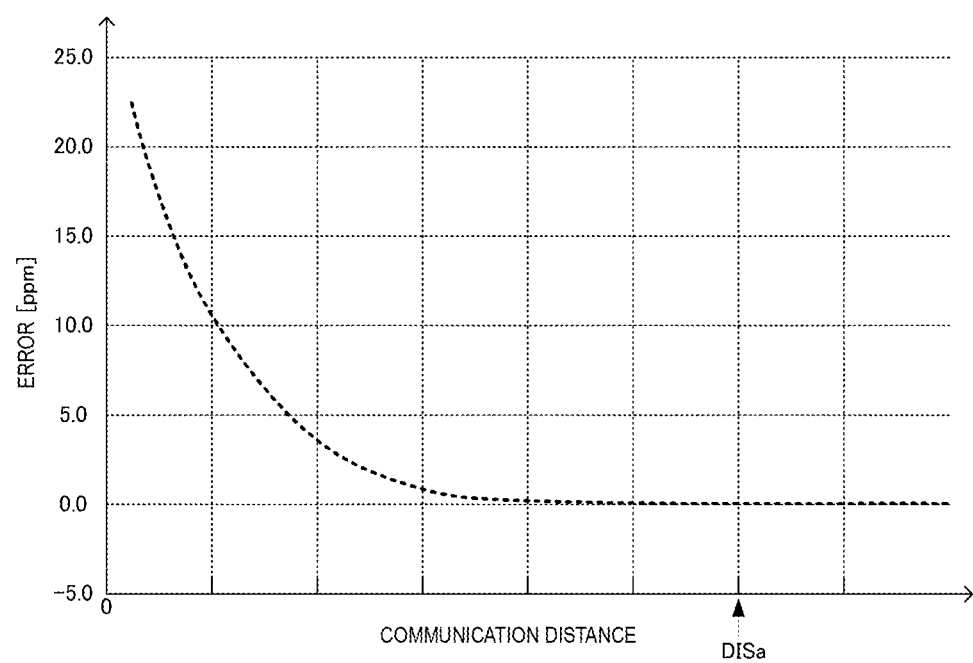
FIG. 11 is a graph illustrating the communication distance and an error in the resonant frequency.

When the above-described process is carried out with the above-described configuration, a result illustrated in FIG. 8 was obtained. FIG. 8 is a graph illustrating dependence of an error in the resonant frequency on the communication distance between the temperature measuring device 10 and the sensor device 20. In FIG. 8, the horizontal axis indicates the communication distance, and the vertical axis indicates the error. The error is calculated with the resonant frequency at the communication distance DISa serving as a reference. In addition, in FIG. 8, the solid line indicates the case of the configuration of the present application, and the broken line indicates the case of the configuration of a related art (same as FIG. 11). As illustrated in FIG. 8, with the configuration and the process of the present embodiment, the resonant frequency to be detected hardly changes even when the communication distance changes. Thus, the temperature of the measurement target portion can be measured with accuracy without necessarily being affected by the communication distance.

Although not being indicated specifically in the foregoing description, the signal strength of the excitation signal of each frequency channel transmitted first is set to a maximum signal strength corresponding to a maximum communication distance between the sensor device 20 and the temperature measuring device 10 that can be anticipated in a measurement system that uses the above-described configuration. Thus, the resonance reverberation signal can be obtained with higher certainty. In addition, the signal strength of the excitation signal can be set to an appropriate strength more quickly than in a case of starting from a possible minimum value or intermediate value. An appropriate signal strength of the excitation signal is a maximum value that does not affect the resonant frequency of the resonance device and is a value corresponding to a case in which the signal strength of the resonance reverberation signal matches the level adjustment threshold Thp.

Figure 9:
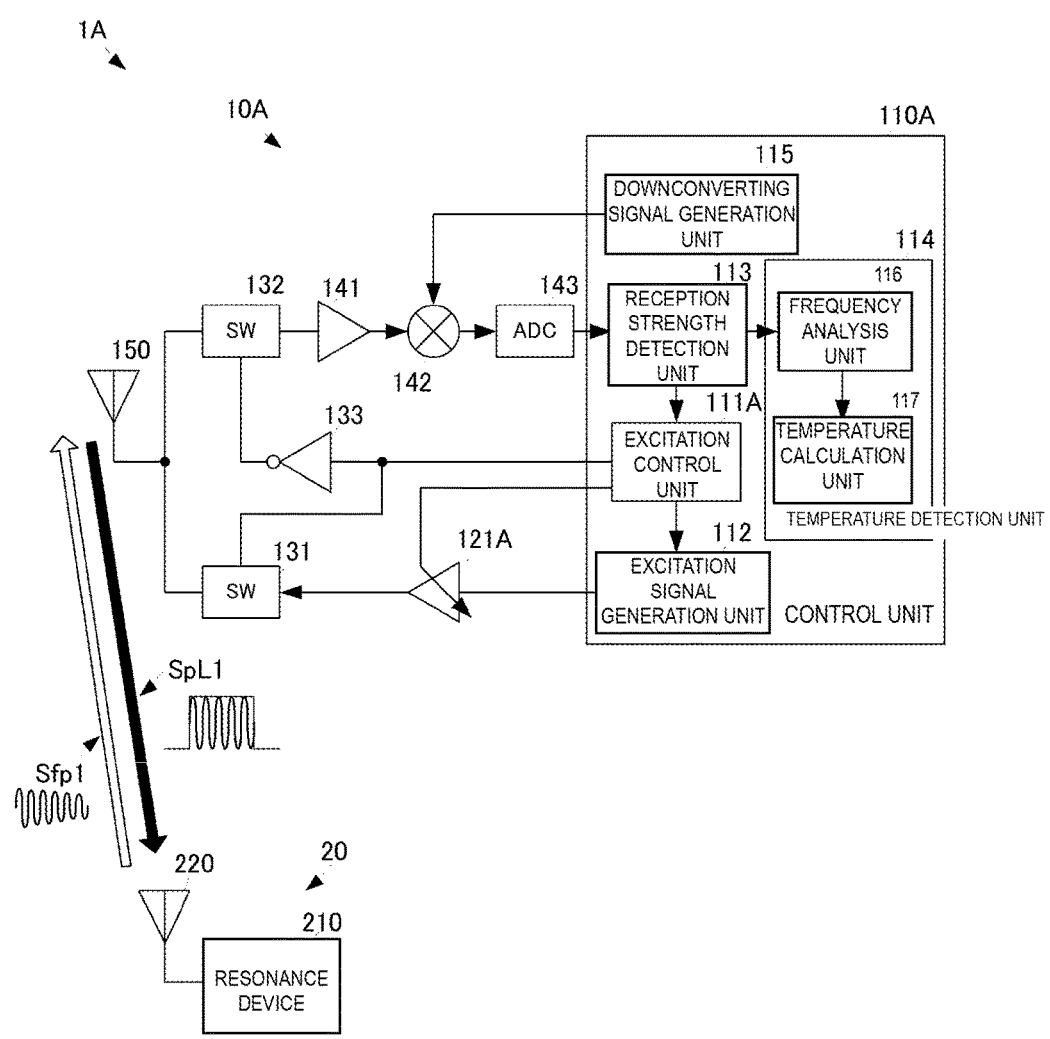
FIG. 9 illustrates a configuration of a temperature measuring system according to a second embodiment of the present disclosure.
Figure 10:
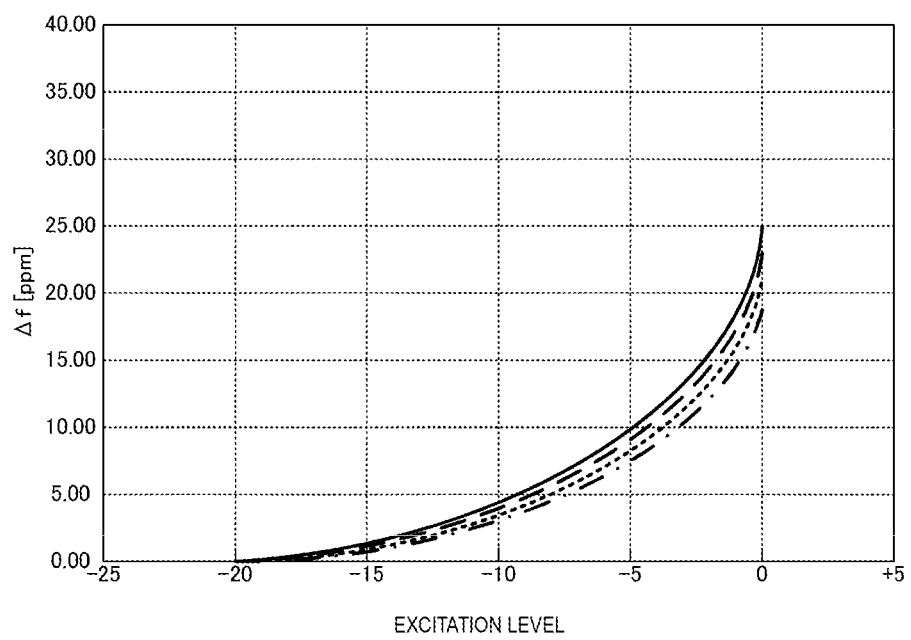
FIG. 10 is a graph illustrating a change in the resonant frequency in accordance with the excitation intensity of a quartz vibrator.

Subsequently, a physical quantity measuring system according to a second embodiment of the present disclosure will be described with reference to the drawings. In the present embodiment as well, a temperature measuring system that measures the temperature of a measurement target portion will be described. FIG. 9 illustrates the configuration of the temperature measuring system according to the second embodiment of the present disclosure.

A temperature measuring system 1A of the present embodiment differs from the temperature measuring system 1 described in the first embodiment in terms of a transmission amplifier and an excitation control unit. Other configurations can be the same or similar to those of the temperature measuring system 1 described in the first embodiment.

A transmission amplifier 121A of a temperature measuring device 10A of the temperature measuring system 1A is an amplifier whose gain can be adjusted. An excitation control unit 111A of a control unit 110A of the temperature measuring system 1A carries out gain adjustment control of the transmission amplifier 121A, in addition to the frequency channel switching control and the transmission and reception control signal control. When the signal strength of the resonance reverberation signal is higher than the level adjustment threshold Thp, the excitation control unit 111A reduces the transmission time and also reduces the gain of the transmission amplifier 121A. Thus, the adjustment range of the signal strength of the excitation signal can be broadened while the accuracy in the adjustment of the signal strength of the excitation signal is retained. In place of the transmission amplifier 121A, a transmission amplifier whose gain cannot be adjusted and a variable resistance connected to an output terminal of the stated transmission amplifier may be used. In this case, a variable resistance value may be varied.

In each of the embodiments described above, the reception strength detection unit 113 and the excitation control unit 111 may obtain the signal strength Pw a plurality of times and control the signal strength of the excitation signal on the basis of the mean value or control the start of an output of the resonance reverberation signal to the temperature detection unit 114. In this manner, by using the mean value, the resonant frequency can be detected with higher accuracy, and the temperature can be measured with higher accuracy.

In addition, although the temperature measuring system and the temperature measuring device are described as examples in each of the embodiments described above, the above-described configuration and process can also be applied to a physical quantity measuring system or a physical quantity measuring device that measures a physical quantity, other than the temperature, such as a magnetic field strength (magnetic flux) on the basis of a change in the resonant frequency of a resonator.

REFERENCE SIGNS LIST 1, 1A TEMPERATURE MEASURING SYSTEMS
10, 10A TEMPERATURE MEASURING DEVICES
110, 110A CONTROL UNITS
111, 111A EXCITATION CONTROL UNITS
112 TRANSMISSION SIGNAL GENERATION UNIT
113 RECEPTION STRENGTH DETECTION UNIT
114 TEMPERATURE DETECTION UNIT
115 DOWNCONVERTING SIGNAL GENERATION UNIT
116 FREQUENCY ANALYSIS UNIT
117 TEMPERATURE CALCULATION UNIT
121, 121A TRANSMISSION AMPLIFIERS
131 FIRST SWITCH
132 SECOND SWITCH
133 INVERSION CIRCUIT
141 RECEPTION AMPLIFIER
142 DOWNCONVERTER
143 ADC (ANALOG-DIGITAL CONVERSION CIRCUIT)
150 ANTENNA
20 SENSOR DEVICE
210 RESONANCE DEVICE
220 RESONANCE-SIDE ANTENNA

The invention claimed is:

1. A physical quantity measuring device, comprising:
an excitation signal generation unit that generates an excitation signal composed of burst waves of a predetermined frequency;
an antenna that receives a reception signal corresponding to the excitation signal generated from the excitation signal generation unit and transmits the reception signal to a reception strength detection unit;
the reception strength detection unit that detects a resonance reverberation signal of the excitation signal from the reception signal and detects a signal strength of the resonance reverberation signal;
a physical quantity detection unit that detects a predetermined physical quantity from a resonant frequency of the resonance reverberation signal; and
an excitation control unit that lowers a signal strength of the excitation signal upon detecting that the signal strength of the resonance reverberation signal is higher than a signal strength threshold.

2. The physical quantity measuring device according to claim 1,
wherein the excitation control unit adjusts the signal strength of the excitation signal by adjusting an amplitude level of the excitation signal.

3. The physical quantity measuring device according to claim 1,
wherein the excitation signal generation unit sets an initial excitation signal to a maximum strength among the excitation signals to be transmitted until the signal strength of the resonance reverberation signal finishes to be adjusted.

4. The physical quantity measuring device according to claim 1,
wherein the reception strength detection unit makes a determination on a basis of an amplitude level of the reception signals arranged on a time axis so as to span a predetermined period of time starting from the beginning.

5. The physical quantity measuring device according to claim 1,
wherein the excitation control unit adjusts the signal strength of the excitation signal by adjusting a transmission time length of the excitation signal.

6. The physical quantity measuring device according to claim 5,
wherein the excitation control unit adjusts the signal strength of the excitation signal by adjusting an amplitude level of the excitation signal.

7. The physical quantity measuring device according to claim 1,
wherein the physical quantity detection unit starts detecting the resonant frequency from a point in time at which the signal strength of the resonance reverberation signal reaches or falls below the signal strength threshold.

8. The physical quantity measuring device according to claim 7,
wherein the excitation control unit adjusts the signal strength of the excitation signal by adjusting a transmission time length of the excitation signal.

9. The physical quantity measuring device according to claim 7,
wherein the excitation control unit adjusts the signal strength of the excitation signal by adjusting an amplitude level of the excitation signal.

10. The physical quantity measuring device according to claim 1,
wherein the excitation signal generation unit generates excitation signals of a plurality of frequency channels that have predetermined frequency band widths having mutually different center frequencies, and
wherein the reception strength detection unit detects the resonance reverberation signal by comparing signal strengths of reception signals corresponding to the excitation signals of the respective frequency channels.

11. The physical quantity measuring device according to claim 10,
wherein the physical quantity detection unit starts detecting the resonant frequency from a point in time at which the signal strength of the resonance reverberation signal reaches or falls below the signal strength threshold.

12. The physical quantity measuring device according to claim 10,
wherein the excitation control unit adjusts the signal strength of the excitation signal by adjusting a transmission time length of the excitation signal.

13. The physical quantity measuring device according to claim 10,
wherein the excitation control unit adjusts the signal strength of the excitation signal by adjusting an amplitude level of the excitation signal.

14. The physical quantity measuring device according to claim 10,
wherein, upon detecting the resonance reverberation signal, the excitation control unit controls the excitation signal generation unit so as to generate only an excitation signal of a frequency channel that includes a frequency of the resonance reverberation signal.

15. The physical quantity measuring device according to claim 14,
wherein the physical quantity detection unit starts detecting the resonant frequency from a point in time at which the signal strength of the resonance reverberation signal reaches or falls below the signal strength threshold.

16. The physical quantity measuring device according to claim 14,
wherein the excitation control unit adjusts the signal strength of the excitation signal by adjusting a transmission time length of the excitation signal.

17. The physical quantity measuring device according to claim 14,
wherein the excitation control unit adjusts the signal strength of the excitation signal by adjusting an amplitude level of the excitation signal.

18. A physical quantity measuring system, comprising:
the physical quantity measuring device according to claim 1; and
a sensor device including a resonator that excites upon receiving the excitation signal, resonates at a frequency corresponding to a physical quantity, and generates the resonance reverberation signal; and a resonator-side antenna connected to the resonator.

19. The physical quantity measuring system according to claim 18,
wherein the resonator is a quartz vibrator.

20. The physical quantity measuring system according to claim 18,
wherein the physical quantity is a temperature.

* * * * *